US009766943B2

(12) United States Patent
Blanco et al.

(10) Patent No.: US 9,766,943 B2
(45) Date of Patent: Sep. 19, 2017

(54) METHOD AND SYSTEM FOR MANAGING INTERCONNECTION OF VIRTUAL NETWORK FUNCTIONS

(71) Applicant: Nicira, Inc., Palo Alto, CA (US)

(72) Inventors: Brenden Blanco, Sunnyvale, CA (US); Sushil Singh, Sunnyvale, CA (US); Gaetano Borgione, Sunnyvale, CA (US); Alexei Starovaitov, Sunnyvale, CA (US); Pere Monclus, Sunnyvale, CA (US)

(73) Assignee: Nicira, Inc., Palo Alto, CA (US)

( * ) Notice: Subject to any disclaimer, the term of this patent is extended or adjusted under 35 U.S.C. 154(b) by 300 days.

(21) Appl. No.: 14/253,775

(22) Filed: Apr. 15, 2014

(65) Prior Publication Data

US 2015/0295750 A1    Oct. 15, 2015

(51) Int. Cl.
*G06F 9/50* (2006.01)
*G06F 11/18* (2006.01)
(Continued)

(52) U.S. Cl.
CPC ............ *G06F 9/5077* (2013.01); *G06F 9/455* (2013.01); *G06F 9/50* (2013.01); *G06F 11/181* (2013.01);
(Continued)

(58) Field of Classification Search
CPC ... H04L 49/354; H04L 12/467; H04L 12/462; H04L 12/24; H04L 12/4641; H04L 49/65;
(Continued)

(56) References Cited

U.S. PATENT DOCUMENTS 6,151,618 A * 11/2000 Wahbe ............... G06F 11/3624
714/E11.211
8,656,018 B1 * 2/2014 Keagy ...................... G06F 8/63
709/220

(Continued)

OTHER PUBLICATIONS

Casado et al, "Virtualizing the Network Forwarding Plane", Nov. 30, 2010, ACM, Proceedings of the Workshop PRESTO, article #8.*

(Continued)

*Primary Examiner* — Ramy M Osman
(74) *Attorney, Agent, or Firm* — Hanley, Flight & Zimmerman, LLC

(57) ABSTRACT

A method and apparatus is disclosed herein for use of a connectivity manager and a network infrastructure including the same. In one embodiment, the network infrastructure comprises one or more physical devices communicably coupled into a physical network infrastructure or via the overlay provided by the physical servers; and a virtual network domain containing a virtual network infrastructure executing on the physical network infrastructure. In one embodiment, the virtual network domain comprises one or more virtual network functions connected together through one or more links and executing on the one or more physical devices, and one or more interfaces coupled to one or more network functions via one or more links to communicate data between the virtual network domain and at least one of the one or more physical devices of the physical network infrastructure while the virtual network domain is isolated from other virtual infrastructures executing on the physical network infrastructure.

13 Claims, 11 Drawing Sheets

(51) Int. Cl.
*H04L 12/24* (2006.01)
*H04L 12/931* (2013.01)
*G06F 9/455* (2006.01)

(52) U.S. Cl.
CPC ...... *H04L 41/0803* (2013.01); *H04L 41/0816* (2013.01); *H04L 41/50* (2013.01); *H04L 49/354* (2013.01)

(58) Field of Classification Search
CPC ... H04L 49/70; H04L 41/0803; H04L 41/044; H04L 41/18; H04L 41/50; H04L 41/5077; G06F 11/2069; G06F 11/2025; G06F 11/3624; G06F 11/1484; G06F 9/455; G06F 9/4856; G06F 9/5077; G06F 9/45558; G06F 9/50
See application file for complete search history.

(56) References Cited

U.S. PATENT DOCUMENTS

| | | | | |
|---|---|---|---|---|
| 8,799,419 | B1* | 8/2014 | Lin | G06F 9/45558 709/220 |
| 9,015,824 | B1* | 4/2015 | Drewry | H04L 9/32 726/15 |
| 9,055,095 | B2* | 6/2015 | Murthy | H04L 63/1408 |
| 9,069,587 | B2* | 6/2015 | Agarwal | G06F 9/45558 |
| 9,582,306 | B2* | 2/2017 | Dowlatkhah | G06F 9/44505 |
| 2008/0091891 | A1* | 4/2008 | Shiota | G06F 12/145 711/154 |
| 2009/0059800 | A1* | 3/2009 | Mohan | H04L 12/24 370/241.1 |
| 2011/0060819 | A1* | 3/2011 | Salkewicz | H04L 41/00 709/223 |
| 2011/0134931 | A1* | 6/2011 | Merwe | H04L 41/0816 370/401 |
| 2011/0149800 | A1* | 6/2011 | Ryan | H04L 12/467 370/254 |
| 2012/0059930 | A1* | 3/2012 | Devarakonda | H04L 43/0817 709/224 |
| 2012/0117417 | A1* | 5/2012 | Graham | G06F 11/1484 714/4.12 |
| 2012/0173788 | A1* | 7/2012 | Godwin | G06F 9/45533 710/313 |
| 2013/0055261 | A1* | 2/2013 | Han | G06F 9/4558 718/1 |
| 2013/0089089 | A1* | 4/2013 | Kamath | H04L 49/70 370/358 |
| 2013/0091501 | A1* | 4/2013 | Barabash | H04L 41/5096 718/1 |
| 2013/0339510 | A1* | 12/2013 | Douglas | H04L 41/50 709/223 |
| 2014/0052843 | A1* | 2/2014 | Goyal | H04L 49/65 709/224 |
| 2014/0201374 | A1* | 7/2014 | Ashwood-Smith | G06F 9/50 709/226 |
| 2014/0351396 | A1* | 11/2014 | Stabile | H04L 41/044 709/223 |
| 2015/0212910 | A1* | 7/2015 | Gondi | G06F 11/2033 714/6.3 |
| 2015/0244717 | A1* | 8/2015 | Jin | G06F 9/5077 726/4 |
| 2016/0353367 | A1* | 12/2016 | Vrzic | H04W 72/12 |
| 2016/0353465 | A1* | 12/2016 | Vrzic | H04W 72/12 |

OTHER PUBLICATIONS

Monclus, Pere, "Virtual Network Domain and Network Abstractions", Feb. 4, 2013, PLUMgrid Blog.*
Monclus, Pere, "Control Plane—Data Plane Separation: Architecture Gridlock", Mar. 19, 2013, PLUMgrid Blog.*

* cited by examiner

METHOD AND SYSTEM FOR MANAGING INTERCONNECTION OF VIRTUAL NETWORK FUNCTIONS

FIELD OF THE INVENTION

Embodiments of the present invention relate to the field of computer networking; more particularly, embodiments of the present invention relate to software defined networking virtual network infrastructure solutions.

BACKGROUND OF THE INVENTION

Today's networks have not only grown in size but have also expanded in their flexibility to allow various computing devices to be connected over a network. These devices provide services that are accessible from any number of locations.

At the same time a new set of applications in the area of data centers and cloud computing are pushing the requirements of dynamic provisioning and dynamic instantiation of the network infrastructure. In many current server clusters, the physical resources to support (e.g., run) virtual infrastructure components had to be provisioned before the virtual infrastructure was needed. That is, there was no dynamic provisioning. These newer requirements of dynamic provisioning and dynamic instantiation of the network infrastructure are rapidly expanding in other segments of the IT infrastructures where networking applies.

In traditional computer networks, data paths are implemented by interconnecting switches, routers, and other network devices throughout the network. Traditional computer networks can be too rigid and complex for these new environment requirements.

Recently, the IT industry is undergoing a revolution in the area of virtualization for the benefit of automation, flexibility and cost reduction. A typical data center network deployment scenario includes a number of virtual machines that run on servers. Each of these virtual machines may have one or more connections with other devices in the network. One problem with current virtual infrastructures is that changes made to such virtual network infrastructure by network administrators cannot be made without physically modifying physical network devices of the physical infrastructure. In such a case, the network operator may not be able to make their desired changes if they are not in control of the physical network devices that make up the physical infrastructure. Also, such changes to the physical infrastructure may causes faults or failures that impact other tenants and/or applications. In other words, there is no isolation between the changes made to the virtual infrastructure and the physical infrastructure.

SUMMARY OF THE INVENTION

A method and apparatus is disclosed herein for use of a connectivity manager and a network infrastructure including the same. In one embodiment, the network infrastructure comprises one or more physical devices communicably coupled into a physical network infrastructure; and a virtual network domain containing a virtual network infrastructure executing on the physical network infrastructure or via the overlay provided by the physical servers. In one embodiment, the virtual network domain comprises one or more virtual network functions connected together through one or more links and executing on the one or more physical devices, and one or more interfaces coupled to one or more network functions via one or more links to communicate data between the virtual network domain and at least one of the one or more physical devices of the physical network infrastructure while the virtual network domain is isolated from other virtual infrastructures executing on the physical network infrastructure.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
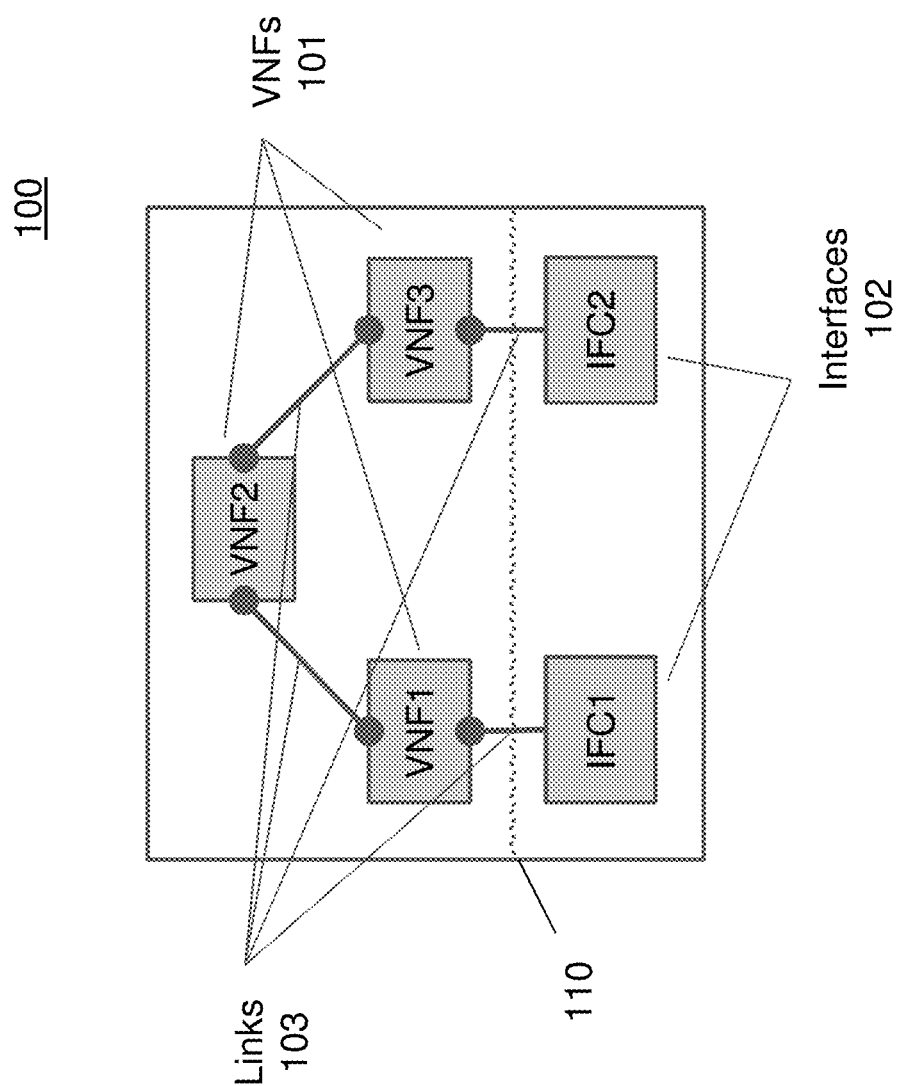
FIG. 1A illustrates one embodiment of a virtual network domain (VND).

A connectivity manager and method for using the same are disclosed. In one embodiment, the connectivity manager controls dynamic on-demand provisioning and creation of a network environment through the introduction and provisioning of the virtual network domain (VND) concept. The connectivity manager is responsive to events that occur indicating that a new interface (e.g., virtual machine, cable, wireless card, etc.) has been detected. In response thereto, the connectivity manager obtains a VND template corresponding to a VND to be configured that contains the interface and thereafter configures and provisions the VND to contain the interface using the VND template. The configuring and provisioning operations are controlled by the connectivity manager based on properties of the interface. Once the configuration and provisioning have been completed, the interface is able to send data traffic through the VND.

In one embodiment, the VND template comprise one or more virtual network functions and one or more interfaces, each of the one or more virtual network functions being connected together through one or more links.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In one embodiment, a network infrastructure described herein comprises one or more physical devices communicably coupled into a physical network infrastructure; and a VND containing a virtual network infrastructure executing on the physical network infrastructure or via the overlay provided by the physical servers. In one embodiment, the VND comprises one or more virtual network functions connected together through one or more links and executing on the one or more physical devices, and one or more interfaces coupled to one or more network functions via one or more links to communicate data between the VND and at least one of the one or more physical devices of the physical network infrastructure while the VND is isolated from other virtual infrastructures executing on the physical network infrastructure.

In one embodiment, changes the VND occur without causing changes to the physical network infrastructure. In one embodiment, a failure occurring in the VND is isolated from other VNDs operating in the network infrastructure. In one embodiment, the VND is associated with a tenant or application, and the failure occurring in the VND is isolated from VNDs of other tenants or applications.

In one embodiment, the VND is created by a network operator of the network infrastructure. In one embodiment, resources in the physical domain to support the VND are instantiated automatically via a pull model only after an interface associated with VND appears.

In one embodiment, the VND comprises a network service function in another VND. In one embodiment, the VND is hierarchically instantiated with respect to said another VND.

In one embodiment, the VND is distributed across a plurality of physical resources in the physical network infrastructure. In one embodiment, at least one of the one or more virtual network functions has a plurality of data plane components that make use of multiple physical resources.

FIG. 1A illustrates one embodiment of a VND. Referring to FIG. 1A, VND 100 comprises virtual network functions (VNFs) 101, interfaces (IFCs) 102, and links 103. VNFs 101 comprise VNF1, VNF2 and VNF3, where VNF1 and VNF2 are coupled by one of links 103 and VNF2 and VNF3 are coupled by another one of links 103. Links 103 represent connections between interfaces of the various components (e.g., VNFs, IFCs, etc.). In one embodiment, each of VNFs 101 is a network function implemented in software that is instantiated and run on one or more physically separate hardware resources in a physical infrastructure of a network. In such a case, the VNF may be fully distributed with a data plane existing in multiple IOVisors. In one embodiment, each of VNFs 101 is capable of being ported and/or moved to those one or more physically separate hardware resources for instantiation and execution thereon.

Note that although only three VNFs, two IFCs, and four links are shown, VNDs may have more or less VNFs, IFCs or links than shown in FIG. 1A.

In one embodiment, a VNF, when operating in cooperation with a physical resource, provides functionality of a device used in a networking environment. Examples of such functionality include functionality to perform as a bridge, router, firewall, load balancer, intrusion prevention system, Network Address Translation (NAT), VPN, DHCP, etc. Each of these functions may be incorporated into a VND.

Two of interfaces 102 are also connected dynamically with VND 100, through two more links. In one embodiment, IFC1 is connected with one of links 103 to VNF1, and IFC2 is connected with another one of links 103 to VNF3. In one embodiment, the IFC is a cable. In another embodiment, the IFC is a virtual machine (VM) (e.g., VMs in a datacenter virtualization). In yet another embodiment, the IFC is a wireless card in a mobile device (e.g., mobile devices in a personal network). In still yet another embodiment, the IFC is a storage interface (e.g., SATA, Fiber Channel, FCoE, ATAoE, etc.).

In one embodiment, VND 100 provides services to the two endpoints (e.g., network hosts, virtual machines (VMs), etc.) represented by IFC1 and IFC2 of interfaces 102. That service is embodied by the flow of information between VNF1, VNF2, VNF3 of VNFs 101, when IFC1 and IFC2 of interfaces 102 are connected as shown in FIG. 1. Examples of such services include, but are not limited to, quality of service, role-based access control network analytics, etc.

In one embodiment, VNDs are created on demand. Dotted-line 110 represents the separation between the portion of VND 100 that is pre-configured (i.e., VNFs 101 coupled together via two of links 103) and that which is completed on demand (i.e., IFCs 102 coupled via two of links 103 to VNF1 and VNF3 of VNFs 101). As discussed above, there may be more IFCs in the VND than shown here, and these IFCs may "appear" and "disappear" as needed.

In one embodiment, the user defines an abstraction that represents the graph of the topology of the VNFs as well as the configuration and type of the various elements. The VNFs have different types based on the function(s) they perform. These include, for example, a bridge, router, etc. Each type of VNF has a configuration. In one embodiment, the abstraction representing the VND is composed of a VNF configuration (application specific), an IFC configuration (application specific), and connectivity (not application specific). The VNF configuration is based on the specific requirements of its application and integration into the network. For example, a VNF may be set up with specific IP addresses or security procedures for the specific tenant.

Figure 1B:
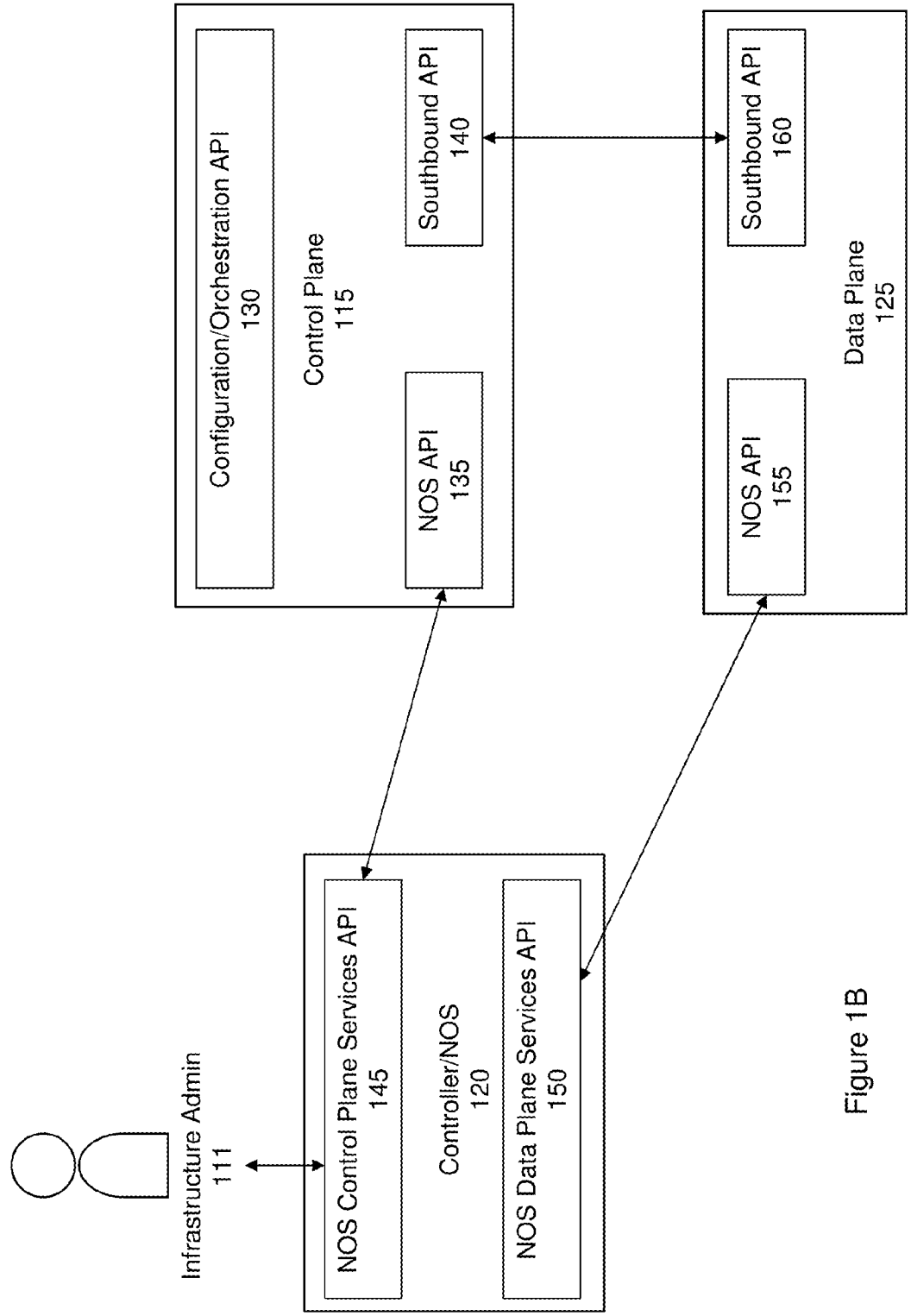
FIG. 1B depicts a virtual network function (VNF) of a VND.

FIG. 1B depicts a virtual network function (VNF) of a VND.

As depicted in FIG. 1B, the network includes a VNF 160, a network operating system (NOS, or controller) 120, and an IO Visor 170. Each of VNF 160, IO Visor 170, and NOS 120 may be stored across one or more computing devices including one or more of a computer processor, memory, and a computer readable storage device including computer code executable by the computer processor. Multiple VNF data planes may exist concurrently for a give VNF. Memory may be random access memory (RAM), cache memory, flash memory, or any other kind of storage structure or device that is configured to store computer instructions/code executable by a computer processor to store data utilized during such execution. The computer readable storage device may be any kind of computer storage device, volatile or non-volatile, such as a hard disk, an optical drive such as a compact disk drive or digital video disk (DVD) drive, and a flash memory drive.

In one embodiment, VNF 160 includes a VNF control plane 115 that has an orchestration API 130, a NOS API 135, and a southbound API 140. Each of orchestration API 130, NOS API 135, and southbound API 140 is a programmatic interface that includes computer code executable by a computer processor to allow users or external modules to interoperate with VNF control plane 115. Specifically, orchestration API 130 allows a user or other management module to communicate with control plane 115. NOS API 135 is a programmatic interface that includes computer code that allows VNF control plane 115 to communicably connect to a network operating system 135. Southbound API 140 is a programmatic interface that allows VNF control plane to communicate with VNF data plane 125 in order to control the behavior of VNF data plane 125.

In one or more embodiments, NOS 120 includes a control plane services API 145 and a data plane services API 150. The control plane services API is a programmatic interface that interacts with NOS API 135 to allow NOS 125 to communicate with control plane 115. In addition, in one embodiment, NOS control plane services API 145 receives instruction from an infrastructure administrator 111, or other management module in the system. NOS data plane services API 150 is a programmatic interface that allows NOS 120 to communicate with data plane 125.

As depicted, IO Visor 170 includes VNF data plane 125, NOS API 155 and DP API 160. In one or more embodiments, NOS API 155 is a programmatic interface that allows NOS 120 to communicate with VNF data plane 125 via NOS data plane services API 150. DP API 160 is a programmatic interface that allows data pane 125 to receive management instructions from control plane 115 via southbound API 140.

VNF data plane 125 includes an engine to dynamically insert and delete VNF data plane elements as directed by the NOS. The engine connects the VNF data plane elements together to perform one or more desired data plane functions on the network traffic for a VNF. As discussed later, as part of configuring and provisioning the VNF of a VND, the VNF data plane elements are allocated to and executed by physical resources.

Each of VNF control plane 115, VNF data plane 125, and NOS 120 may be managed by one or more human, mechanical, or computational administrators. As depicted, infrastructure administrator 111 manages the NOS 120. However, those skilled in the art will appreciate that any of network application administrator 105 and infrastructure administrator 111 may be replaced by a single entity, or one or more computing modules.

Figure 2:
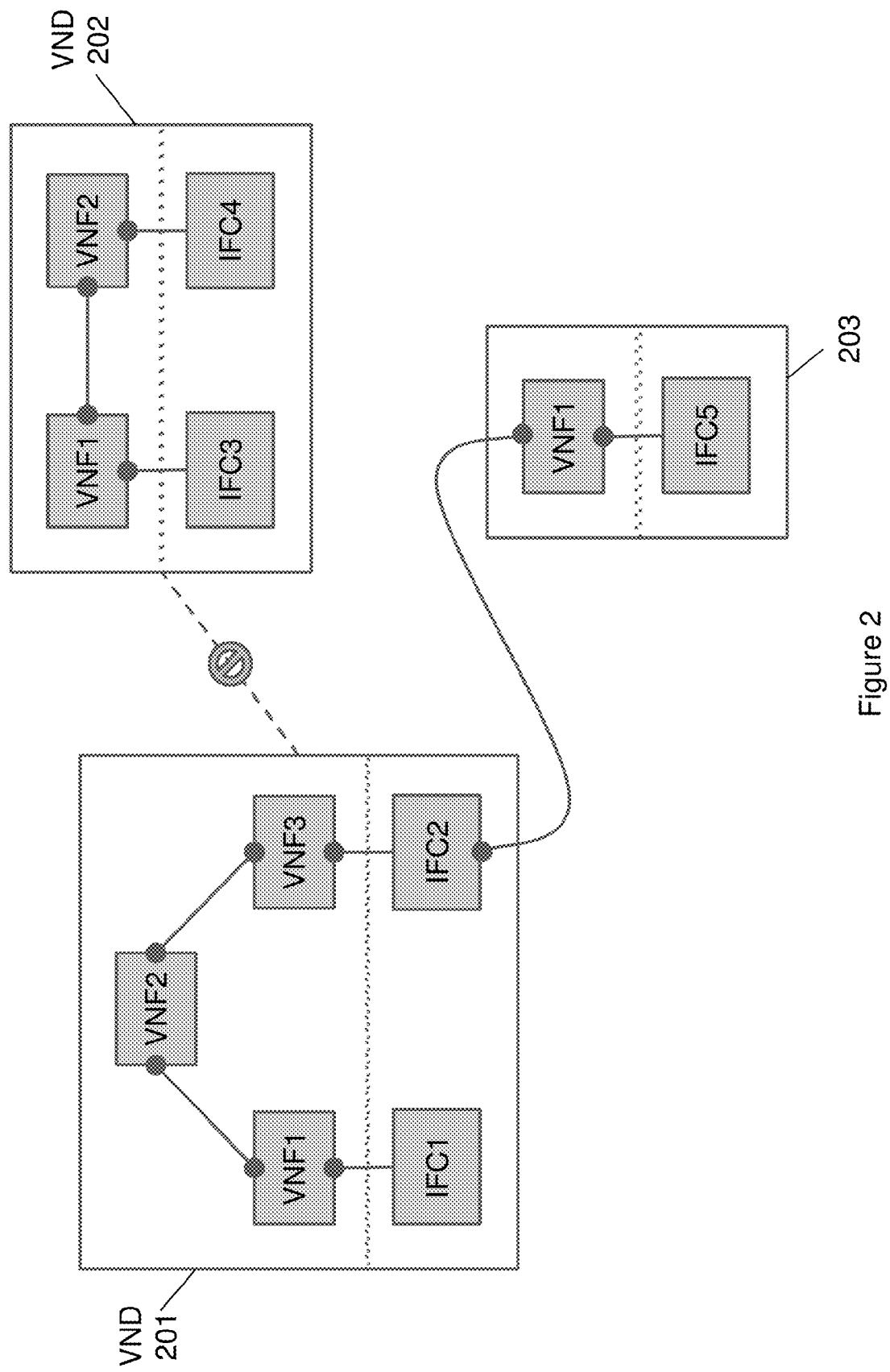
FIG. 2 illustrates isolated and interconnected VNDs.

In FIG. 2, a VND provides an abstraction for multiple purposes. In one embodiment, a VND enables isolation to prevent a VND from communicating with another VND. In one embodiment, a VND is used to provide services to another VND. FIG. 2 illustrates examples of isolated and interconnected VNDs. Referring to FIG. 2, VND 201 is in the same configuration as VND 100 in FIG. 1 and is isolated from VND 202. This isolation is implemented by preventing the data plane layers associated with the VNFs of each VND from being connected or interfaced with each other. The isolation may be useful when VND 201 and VND 202 are part of domains of two competitors (e.g., one VND is with Coke and another VND is with Pepsi). In another example, the isolation may be useful when VND 201 and VND 202 provide services for two different department-specific networks (e.g., accounting and engineering department servers of a company) that are not suppose to communicate between each other.

Figure 10:
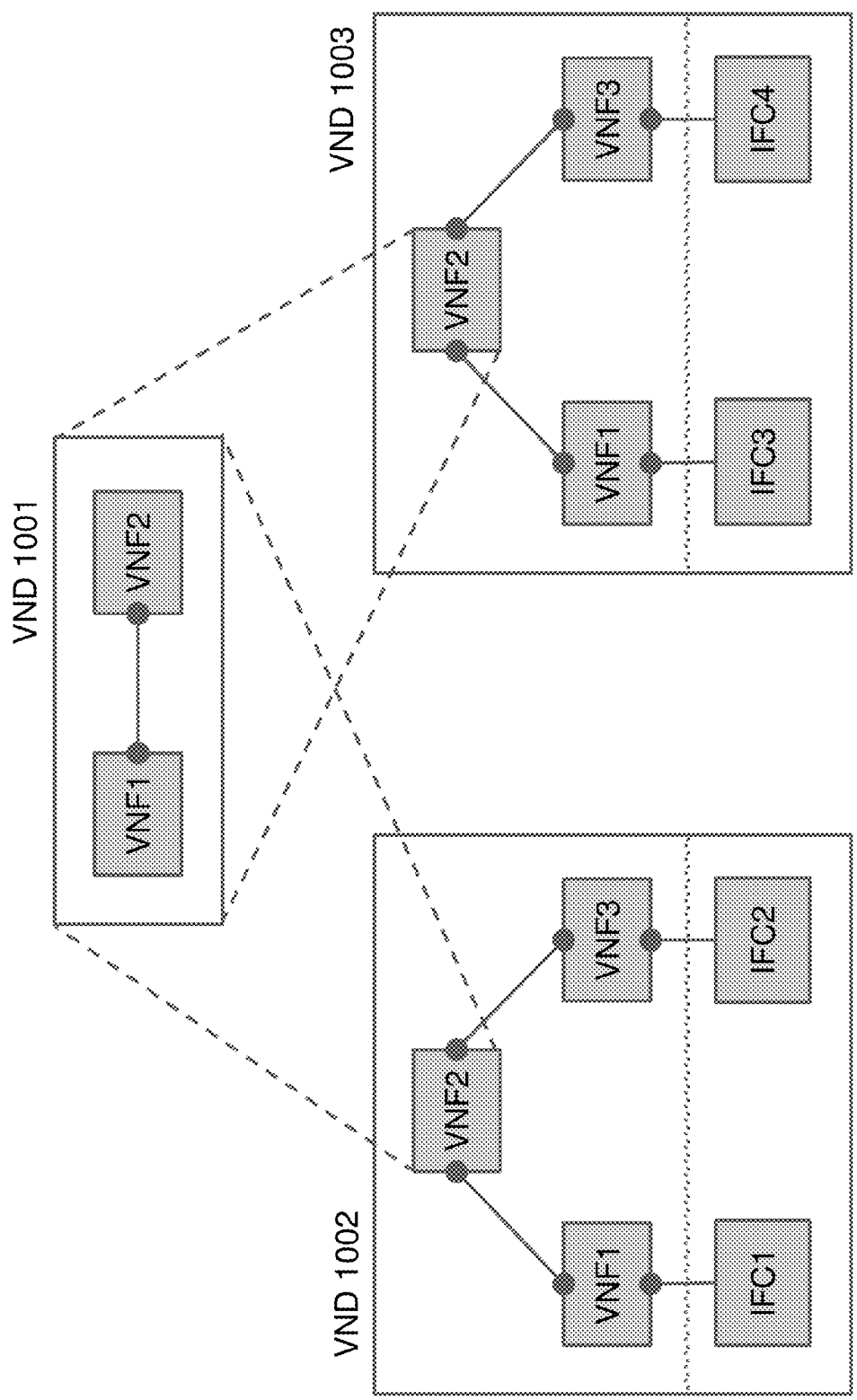
FIG. 10 illustrates an arrangement in which a VND provides a service to other VNDs.

In one embodiment, a VND provides service to one or more other VNDs. In such a case, a network service is created by using a first VND template as a network service function of a second VND. In one embodiment, this first VND template is hierarchically instantiated with respect to the instantiation of the second VND to which the first VND provides a service. FIG. 10 illustrates an arrangement in which a VND provides a service to other VNDs. Referring to FIG. 10, VND 1001 operates as a service to provide a function to both VNDs 1002 and 1003.

Referring back to FIG. 2, VND 201 is interconnected with VND 203. Specifically, interface IFC2 of VND 201 is connected to virtual network function VNF1 of VND 203 via a link. Note that even though VND 201 and VND 202 are isolated from each other, they may both be connected with VND 203. For example, while VND 201 and VND 202 may provide services for two different departments of an organization that are not suppose to communicate between each other, VND 201 and VND 202 may be connected to VND 203 (e.g., accounting and engineering department servers of a company that do not communicate with each other, yet both still access an employee database via VND 203).

In one embodiment, a VND is expressed as a configuration of VNFs, links, and rules. The configuration is performed in such a way so that a provisioning of resources to implement the VND is only as needed. That is, physical resources to support the VND are only provisioned when a virtual machine boots. Thus, the physical resources are not provisioned prior to the virtual machine being booted, thereby resulting in the underutilization of those resources. Similarly, as soon as a virtual machine shuts down, the resources are released, thereby allowing them to be utilized by other virtual machines.

Figure 3:
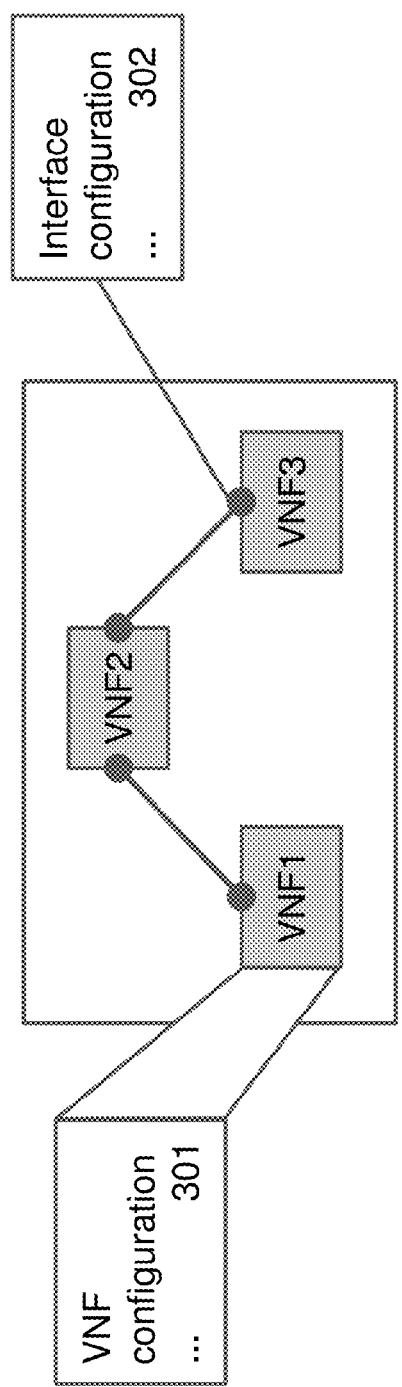
FIG. 3 illustrates the VNFs of FIG. 1 with a VNF configuration and an interface configuration.

FIG. 3 illustrates the VNFs of FIG. 1 with a VNF configuration 301 and an interface configuration 302. In one embodiment, each of the VNFs has its own separate configuration, with the interface configuration being part of the VNF configuration. The configuration interface specifies the VNFs for a particular VND to be configured and provisioned so that, when connected, the VNFs perform the desired functionality in the network. The configuration interface may include specific parameters for controlling the processes of the data plane and/or the control plane. The VNF configuration information may relate to settings within the control plane processes that are not interface specific. For example, if the VNF is a router, then there may be a static route configuration. If the VNF is a NAT service, then there is an IP address range configuration that is needed and utilized. Also, if the VNF is a firewall, then there is an access policy configuration. In one embodiment, the properties of an interface determine the manner in which a VND is to be configured and provisioned to contain that interface. This information is stored in a data structure and is provided by the cloud management system (or some other controller). The interface has an identity (e.g., a name of the VM), and based on that identity, the interface will be ported to the proper VND, and within that proper VND, the interface will be processed to perform the correct function. For example, when a VM appears, the connectivity manager checks the identity of the VM based on information stored in the system and determines that for this particular VM it has to be programmed to perform as a router and a switch. In one embodiment, the connectivity manager sets up the control plane of the virtualized network domain (e.g., router) and causes the download of the data plane of the virtualized network domain (e.g., router).

In one embodiment, the detection (e.g., plugging in) of an interface serves as the trigger event that begins execution of a state machine that results in the interface being able to send information in the VND. In one embodiment, the detection may occur in response to a cable being plugged in. In another embodiment, the detection may occur after a virtual machine has booted up in a hypervisor.

Figure 4:
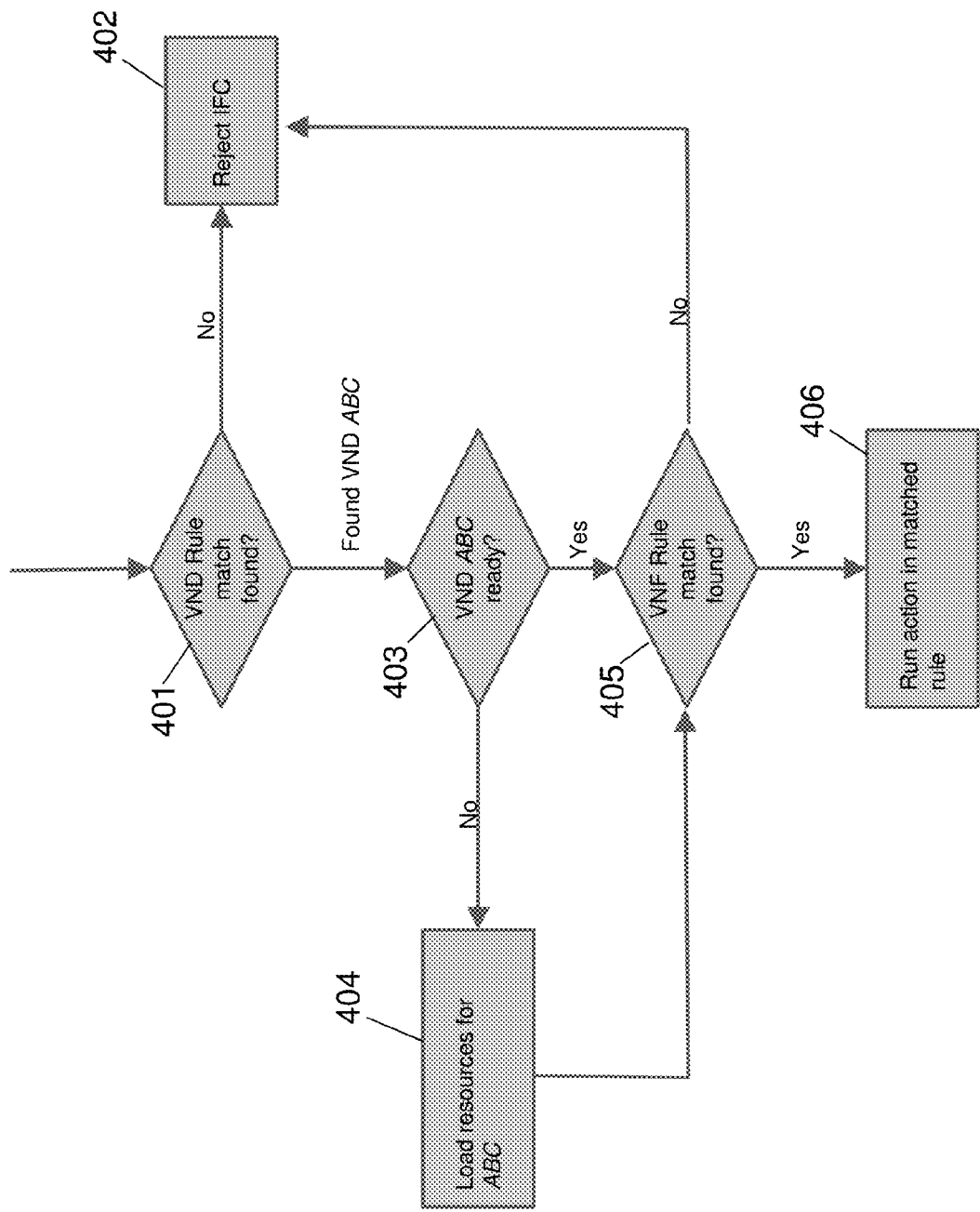
FIG. 4 illustrates one embodiment of the state machine.

In one embodiment, the connectivity manager (CM) contains a decision engine/state machine that is used to classify new interfaces that are discovered in the system. One embodiment of the state machine is shown in FIG. 4. The state machine is implemented using processing logic that comprises software, hardware, and/or firmware.

Referring to FIG. 4, in response to the trigger event, processing logic in the connectivity manager determines if the interface properties of the interface IFC match a VND rule that is stored in a lookup table (processing block 401). In one embodiment, this lookup table is stored in the memory used and accessed by the connectivity manager. In one embodiment, the trigger event contains interface properties that uniquely describe the identity of the interface, and the rules in the table embody identity polices that allow the expression of the VND in which the interface belongs. By matching the interface properties to a rule the table, processing logic in the connectivity manager is able to choose a VND configuration to load.

If a match is not found, processing logic in the connectivity manager rejects the interface (processing block 402) and the state machine transitions to processing block 405.

If a match is found, processing logic determines if the VND associated with the VND configuration is ready (processing block 403). The VND is considered ready if computing resources necessary to run the VNFs within the operation system are allocated and provisioned. Examples of resources include application processes for the control plane that needs to start running and the mapping of VNF data plane elements to the physical resource, upon which the control plane depends. Note other physical resources, such as computing resources, memory, network bandwidth, etc. may need to be allocated as well, including other physical machines or virtual machines upon which the application processes run.

If the VND is not ready (e.g., resources are not loaded), processing logic allocates resources to make the VND available (processing block 404) and the process transitions to processing block 405.

At processing block 405, processing logic in the connectivity manager again determines if a match exists between the interface properties to another set of rules to run an action that is implemented inside the VND. The action may be to link the new IFC interface with a particular VNF of the VND. The action can also set additional properties of the VND besides creating links, and can be user specifiable. For example, an action could set a bandwidth limit for the interface (e.g., a user can configure the action to set a bandwidth limit on the link when a VM IFC is connected.), enable packet capture for packets on the interface, enable quality of service associated with the interface, and/or other features as that are to be supported.

Figure 5:
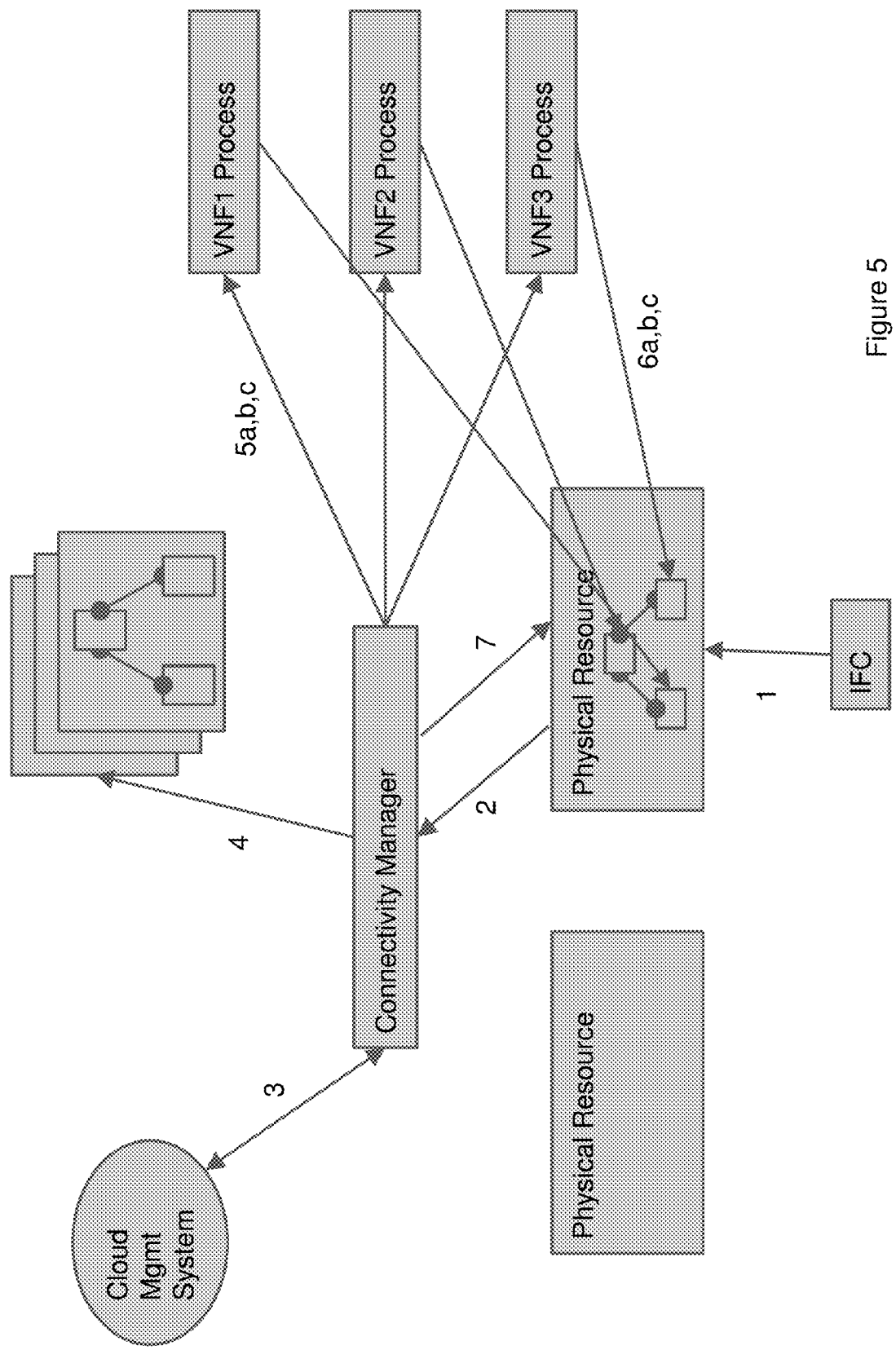
FIG. 5 is a data flow diagram illustrating one embodiment of a process for creating and provisioning resources in a network environment.

In one embodiment, the connectivity manager orchestrates the creation and provisioning of resources. FIG. 5 is a data flow diagram illustrating one embodiment of a process for creating and provisioning resources in a network environment. FIG. 5 includes a cloud management system (CMS) that manages the overall virtual network environment. In one embodiment, the CMS is a suite of software for managing a life cycle of a virtual machine. For the virtual machine, the CMS is responsible for creating an abstraction of the CPU, which is managing the files on disks (i.e., the hard disk of a virtual machine). In one embodiment, the CMS is provided by, for example, VMWare or OpenStack. The connectivity manager makes API calls to the CMS to implement the IO part of the virtual network infrastructure.

The following represents the data flow.

(1) An interface is detected in the system (e.g. a virtual machine begins to boot in a hypervisor). A controller manages different physical resources (e.g., one or more computers) that emulate virtual machines inside themselves. This controller prepares the physical machine for the virtual machine in a manner well-known in the art. The controller prepares the metadata for how that virtual machine is to be started and starts running software, which emulates the virtual machine.

(2) In one embodiment, the physical resource (e.g., a server in which the VM resides) notifies the connectivity manager that an interface (e.g., a VM) is now present. This may be done via an API call from the controller of the physical resource that indicates there is an emulated physical interface (e.g., an emulated network interface) on a computer system that the connectivity manager should identify and determine if the connectivity manager should take ownership of the interface. The API call specifies the identity of the interface. In the case of the interface being a virtual machine, the API call specifies all the information about the virtual machine and includes metadata about what the interface requires. The information may include an identifier that may be used by the CM to look up more information stored in memory that corresponds to the interface. This memory may be the memory used by the CM process or through an API that the CMS allows the CM to call.

Alternatively, the CM may learn the identity of the interface via monitoring by an edge component, traffic (e.g., packets) flowing on wires and detecting metadata from the traffic. In one embodiment, the learned information may comprise a MAC address or an IP address. This information or other learned information may be used to look up additional information about the interface in a table or other memory (to identify the interface). The additional information may be a unique identifier for the interface. In such a case, the table provides a mapping between the MAC or IP address and the unique identifier.

Note that the mapping may be performed by the CMS. In one embodiment, the CMS provides the CM with the unique identifier-to-address mapping. This information may be provided from the CMS to the CM in an API call prior to the CM being notified of the interface has become available. For example, in one embodiment, before an virtual machine boots, the CMS notifies the CM of the unique identifier to MAC address mapping for the virtual machines, such that the CM is ready to configure and provision the VND that contains that virtual machine (i.e., the interface) as soon as it is detected.

(3) The CM retrieves the identity of the interface from the CMS.

(4) The CM chooses a) one VND to which the interface belongs and b) one VNF inside the VND to which the interface belongs. Note that if the interface is the first of a VND that has many, the first interface triggers the process to provision the entire VND. Thus, when the first interface for a VND is triggered, its gets mapped to the physical resource.

(5) The CM loads the resources (e.g., processes) that are required for the VND. In one embodiment, these processes correspond to the control plane of the VND. In other words, the CM loads the resources to implement the control plane of the VND.

(6) The control plane resources provision their respective resources on the physical substrate on which the interface resides. More specifically, in one embodiment, the VNF also has one or a collection of VNF data plane elements which operate in the data plane. For the data plane to work properly, the control plane processes need to configure the tables or settings that exist within the VNF data plane element on the physical resource. The VNF control plane directly controls the table and configuration within the VNF data plane elements on the physical resource.

(7) The CM completes provisioning of the physical substrate by connecting the VNFs together. The connections are specified by the VNF and interface configuration information. In one embodiment, the connection of VNFs may be performed by updating pointers to specify one port associated with one VNF is connected with a port of another VNF. In one embodiment, to implement this, the IO visor maintains a table of VNF data plane elements, and ports within the VNF data plane elements. An API that the CM has into the IO visor allows the CM to connect one VNF data plane element and port combination to another VNF data plane element and port combination. In effect, the CM is making an API call to the IO visor to connect (or disconnect) a "wire" between VNF data plane element ports.

Figure 6:
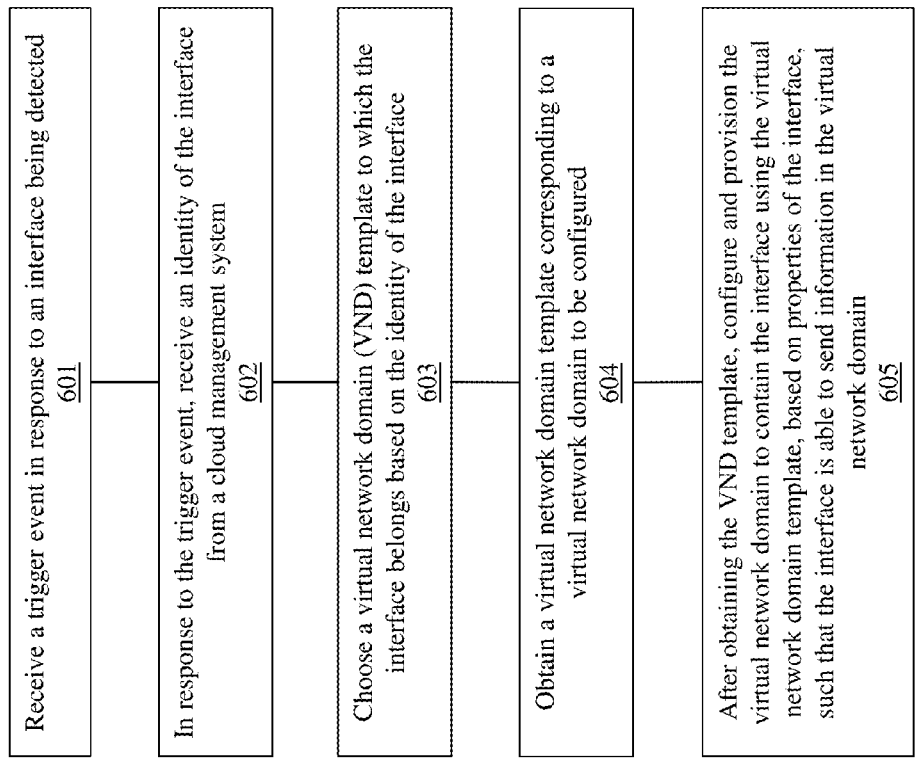
FIG. 6 is a flow diagram of one embodiment of a process for performing dynamic on-demand provisioning and creation of a network environment.

FIG. 6 is a flow diagram of one embodiment of a process for performing dynamic on-demand provisioning and creation of a network environment. The process is performed by processing logic that may comprise hardware (circuitry, dedicated logic, etc.), software (such as is run on a general purpose computer system or a dedicated machine), or a combination of both.

Referring to FIG. 6, the process begins by processing logic receiving a trigger event in response to an interface being detected (processing block 601). In one embodiment, the trigger event is generated in response to a virtual machine booting in a hypervisor.

In response to the trigger event, processing logic receives an identity of the interface from a cloud management system (processing block 602) and chooses a VND template to which the interface belongs based on the identity of the interface (processing block 603).

Processing logic obtains a VND template corresponding to a VND to be configured (processing block 604). In one embodiment, the VND template comprises one or more virtual network functions and one or more interfaces, where each of the one or more virtual network functions being connected together through one or more links. In one embodiment, the VND template provides one or more services to the one or more interfaces when the one or more services are connected dynamically with the VND template via one or more links.

After obtaining the VND template, processing logic configures and provisions the VND to contain the interface using the VND template, based on properties of the interface, such that the interface is able to send information in the VND (processing block 605). In one embodiment, configuring and provisioning the VND to contain the interface comprises loading a first set of resources required for the VND, provisioning a second set of resources on a first physical substrate on which the interface resides, wherein the first set of resources provision the second set of resources, and connecting the one or more virtual network functions together to complete provisioning the first physical substrate. In one embodiment, the first physical substrate is not dependent on which VND template is selected for configuring and provisioning.

In one embodiment, the CM implements two methods to reduce, and potentially minimize, unnecessary consumption of resources. This allows more economical use of precious resources.

First, the CM records the interfaces that are associated with a VND. If a VND has no classified interfaces, then all resources for that VND are stopped/unloaded from memory. In one embodiment, this is implemented by the CM counting the number of dynamic interfaces that a VND currently has running on a physical resource and, based on the number, the CM can determine whether an interface of the VND is still in existence. For example, if the CMS powers down a physical resource, the interfaces on the resource would no longer exist. In such a case, the CM signals the VNF control plane to un-map the VNF data plane elements in the data plane from the physical resource to free up that mapping. Note that the CMS is responsible for bringing the virtual machine down (or up).

Second, the location of interfaces in 'physical' infrastructure is recorded. If interfaces that comprise a VND no longer require resources in that physical location (e.g., the interface is shut down or moves to another physical location), then resources are reclaimed by sending messages to the components of that VND. In one embodiment, these components comprise the processes that were started to implement the control plane, which need to be notified so that they can un-map the VNF data plane elements on that physical resource, and the mappings ("wires") described above. In one embodiment, the CM knows that a resource is needed or not because it maintains a dynamic interface count on both per VND and per physical resource basis.

Figure 7:
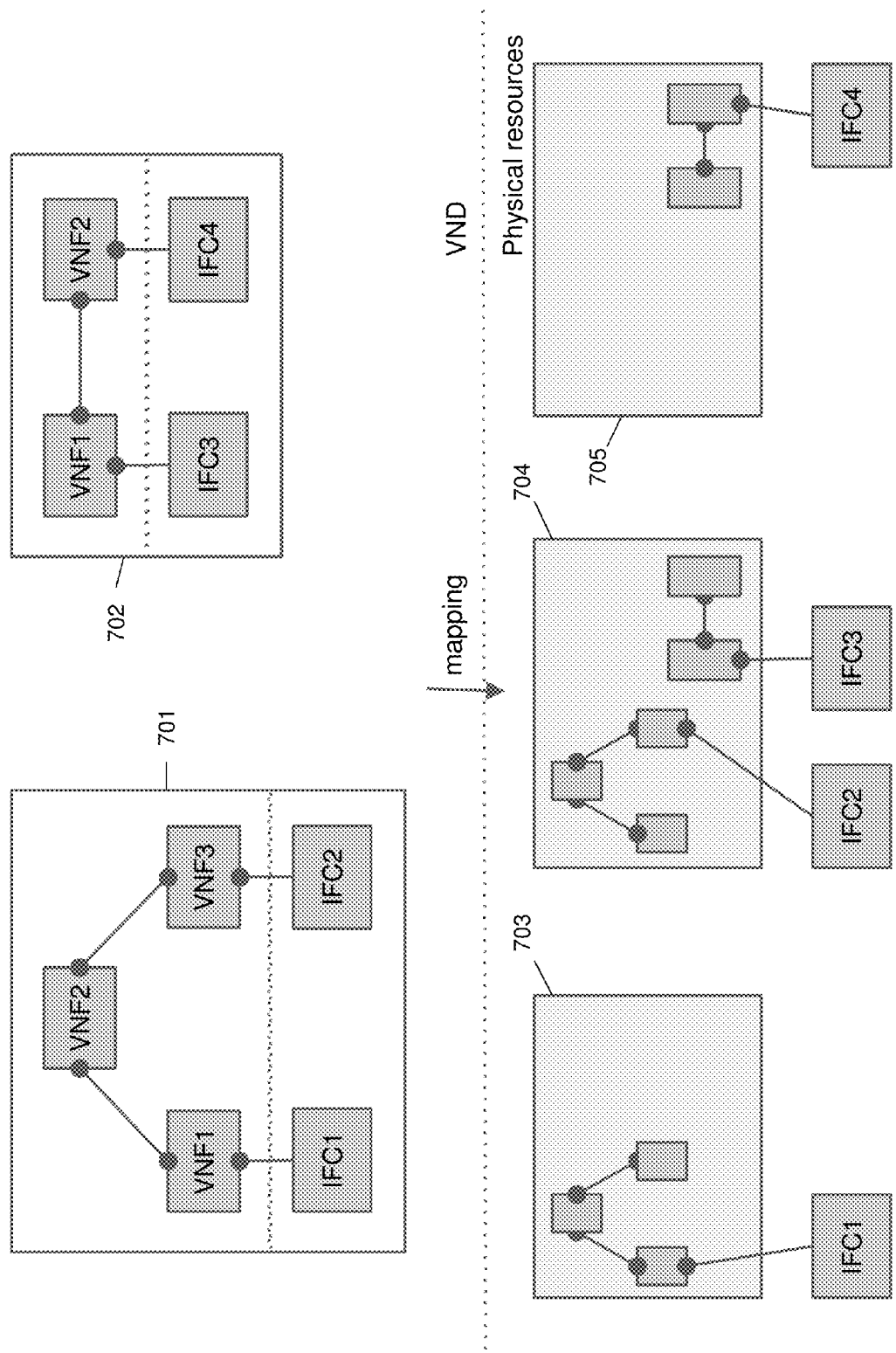
FIG. 7 illustrates an example of VNDs being provisioned over multiple physical structures.

FIG. 7 illustrates an example of different parts of two VNDs being mapped to different physical resources. Referring to FIG. 7, VND 701 includes VNF1, VNF2, and VNF3 and IFC1 and IFC2. VNF1, VNF2, and VNF3 are connected via links. VNF1 is connected to IFC1 via a link and VNF3 is connected to IFC2 via a link. VND 701 is mapped to physical resources 703 and 704. Specifically, the portion of VND 701 that supports the interface to IFC1 is mapped to physical resource 703, while the portion of VND 701 that supports the interface to IFC2 is mapped to physical resource 704. Similarly, VND 702 includes VNF1 and VNF2 and IFC1 and IFC2. VNF1 and VNF2 are connected via a link. VNF1 is connected to IFC1 via a link and VNF2 is connected to IFC2 via a link. VND 702 is mapped to physical resources 704 and 705. Specifically, the portion of VND 702 that supports the interface to IFC1 is mapped to physical resource 704, while the portion of VND 702 that supports the interface to IFC2 is mapped to physical resource 705.

Figure 8:
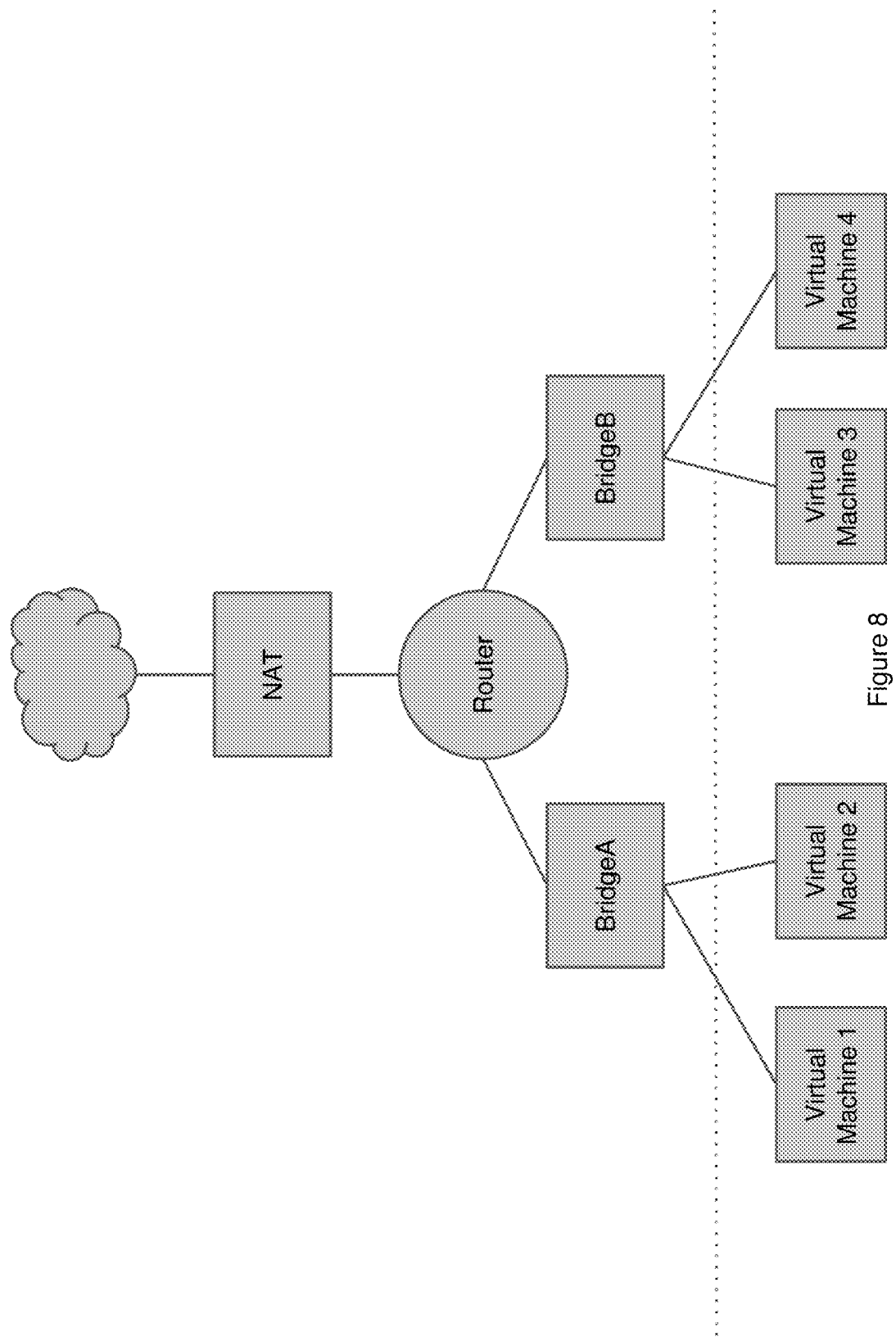
FIG. 8 illustrates example VNFs shown above exemplify one possible application of a VND implementing a useful real-world example.

FIG. 8 illustrates example VNFs shown above exemplify one possible application of a VND implementing a useful real-world example.

Figure 9:
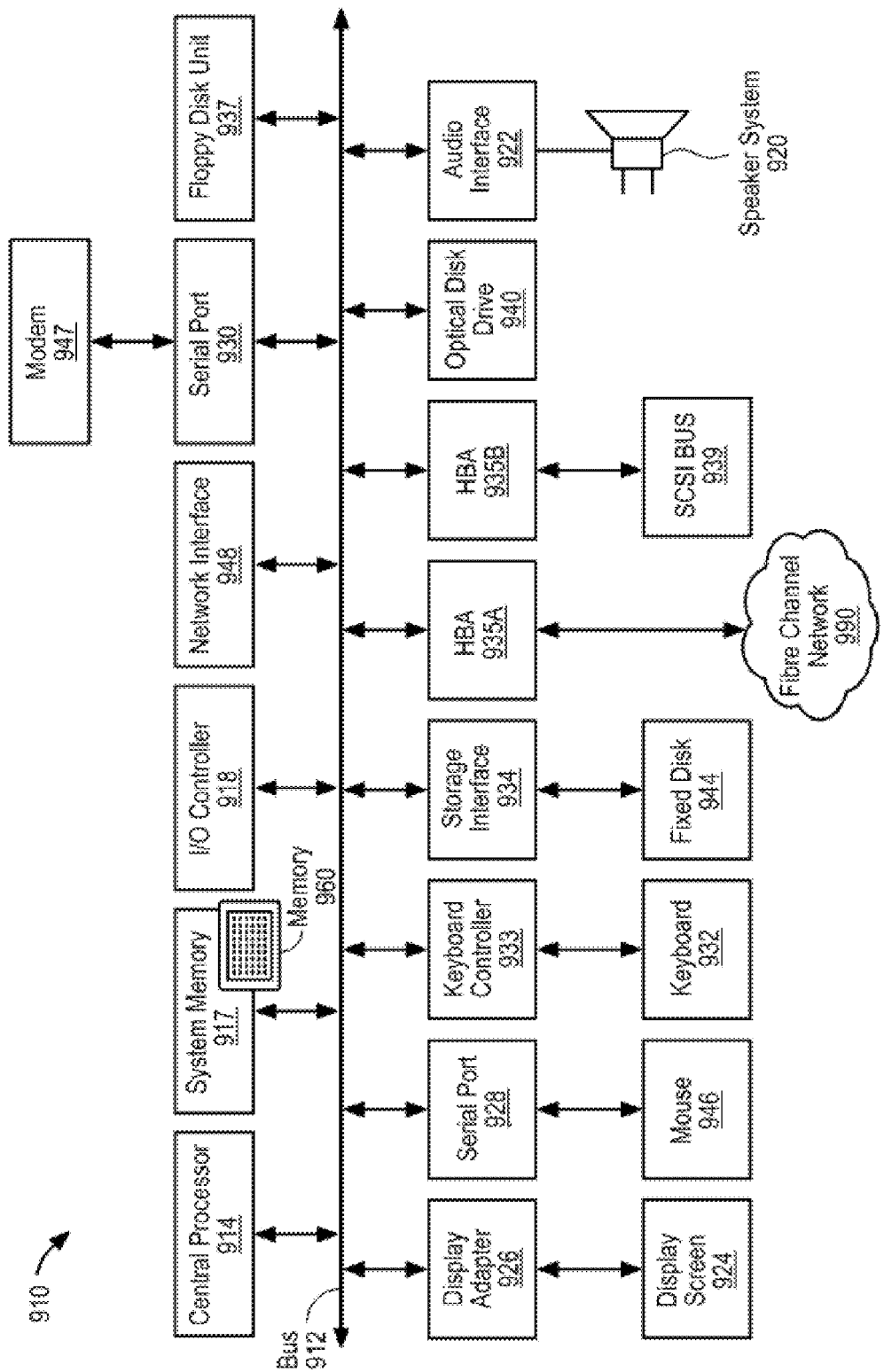
FIG. 9 depicts a block diagram of a computer system.

FIG. 9 depicts a block diagram of a computer system. The computer system may be a physical substrate or server system upon which software or virtual machines discussed herein are executed.

Referring to FIG. 9, computer system 910 includes a bus 912 to interconnect subsystems of computer system 910, such as a processor 914, a system memory 917 (e.g., RAM, ROM, etc.), an input/output controller 918, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917. System memory 917 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems.

Modem 947 may provide a direct connection to a remote server via a telephone link or to the Internet via an internet service provider (ISP). Network interface 948 may provide a direct connection to a remote server. Network interface 948 may provide a direct connection to a remote server via a direct network link to the Internet via a POP (point of presence). Network interface 948 may provide such connection using wireless techniques, including digital cellular telephone connection, a packet connection, digital satellite data connection or the like.

Many other devices or subsystems (not shown) may be connected in a similar manner. Conversely, all of the devices shown in FIG. 9 need not be present to practice the techniques described herein. The devices and subsystems can be interconnected in different ways from that shown in FIG. 9. The operation of a computer system such as that shown in FIG. 9 is readily known in the art and is not discussed in detail in this application.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A network infrastructure comprising:
   one or more physical devices communicably coupled into a physical network infrastructure;
   a virtual network domain containing a virtual network infrastructure executing on the physical network infrastructure or via an overlay provided by physical devices of the physical network infrastructure, the virtual network domain including:
     virtual network functions in communication via one or more links and executing on the one or more physical devices, at least one of the virtual network functions including a network operating system, a data plane, and a control plane, and
     one or more interfaces to communicate with one or more of the virtual network functions via one or more links to communicate data between the virtual network domain and at least one of the one or more physical devices of the physical network infrastructure while the virtual network domain is isolated from another virtual infrastructure executing on the physical network infrastructure by preventing the data planes associated with the virtual network functions of the virtual network domain from being connected or interfaced with the other virtual infrastructure; and
   a connectivity manager to trigger provisioning of the virtual network domain in response to detecting a presence of at least one of the interfaces and in response to determining that the at least one of the interfaces is associated with identity information corresponding to the virtual network domain.

2. The network infrastructure defined in claim 1, wherein changes in the virtual network domain occur without causing changes to the physical network infrastructure.

3. The network infrastructure defined in claim 2, wherein a failure occurring in the virtual network domain is isolated from other virtual network domains operating on the physical network infrastructure.

4. The network infrastructure defined in claim 3, wherein the virtual network domain is associated with a tenant or application, and the failure occurring in the virtual network domain is isolated from virtual network domains of other tenants or applications.

5. The network infrastructure defined in claimed 1, wherein the virtual network domain is created by a network operator of the network infrastructure.

6. The network infrastructure defined in claim 1, wherein resources in the physical devices to support the virtual network domain are instantiated automatically via a pull model only after the at least one of the interfaces associated with the identity information corresponding to the virtual network domain appears.

7. The network infrastructure defined in claim 1, wherein the virtual network domain is a first virtual network domain, and the first virtual network domain includes a network service function in a second virtual network domain.

8. The network infrastructure defined in claim 7, wherein the first virtual network domain is hierarchically instantiated with respect to the second virtual network domain.

9. The network infrastructure defined in claim 1, wherein the virtual network domain is distributed across a plurality of physical resources in the physical network infrastructure.

10. The network infrastructure defined in claim 9, wherein at least one of the virtual network functions has a plurality of data plane components, the data plane components making use of multiple physical resources.

11. The network infrastructure defined in claim 1, wherein the connectivity manager is to trigger connecting of a second one of the interfaces to at least one of the virtual functions of the virtual network domain in response to detecting a presence of the second one of the interfaces.

12. The network infrastructure defined in claim 1, wherein one of the virtual network functions implements a network service corresponding to at least one of a bridge, a router, a firewall, a load balancer or an intrusion protection system.

13. The network infrastructure defined in claim 1, wherein the connectivity manager communicates with a cloud management system to determine that the identity information associated with the at least one of the interfaces corresponds to the virtual network domain.

* * * * *